United States Patent
Kaake et al.

(12)

(10) Patent No.: US 6,307,318 B1
(45) Date of Patent: Oct. 23, 2001

(54) APPARATUS FOR MAKING BACK GLASS SUBSTRATE FOR PLASMA DISPLAY PANEL AND RESULTANT PRODUCT

(75) Inventors: Steven A. F. Kaake, Perrysburg; Robert D. Nicholson, Pemberville, both of OH (US)

(73) Assignee: Photonics Systems, Inc., Northwood, OH (US)

( * ) Notice: Subject to any disclaimer, the term of this patent is extended or adjusted under 35 U.S.C. 154(b) by 0 days.

(21) Appl. No.: 09/383,764

(22) Filed: Aug. 26, 1999

Related U.S. Application Data

(62) Division of application No. 08/899,917, filed on Jul. 24, 1997, now Pat. No. 6,194,042.

(51) Int. Cl.⁷ .................................................. H01J 17/49
(52) U.S. Cl. ............................ 313/586; 445/24; 313/582; 313/609; 313/632
(58) Field of Search ..................... 445/22, 24; 65/102, 65/106; 313/582, 492, 581–590, 605–612, 620, 621

(56) References Cited

U.S. PATENT DOCUMENTS 5,032,768 * 7/1991 Lee et al. ............................ 313/582

6,008,582 * 12/1999 Asano et al. ......................... 313/582

* cited by examiner

Primary Examiner—Ashok Patel
Assistant Examiner—Matthew J. Gerike
(74) Attorney, Agent, or Firm—Marshall & Melhorn, LLC

(57) ABSTRACT

A method and apparatus (50, 70, 90) for making a back glass substrate (24) for a plasma display panel (20) by forming hot sheet glass G heated above its annealing point and embodied either as a continuous ribbon (60) or discrete sheets (74). The hot forming provides the hot sheet glass G with gas discharge troughs (38) spaced by barrier ribs (40). The hot forming of the sheet glass G heated above its annealing point can be performed by a rotatable forming member (62) having curved projections (66) or by a press member (78) having elongated projections (84). The constructed plasma display panel (20) has a front glass substrate (22) and a back glass substrate (24) with the gas discharge trough and barrier rib construction made by hot forming above the annealing point. The gas discharge troughs (38) can be hot formed with bottom surfaces (95) that have an undulating shape along their lengths to enhance luminescence of phosphors (48), and the barrier ribs (40) can have distal ends with openings (98) that provide communication between the gas discharge troughs (38) and that are located adjacent peaks (100) of the trough bottom surfaces (94) remote from the location of discharge.

23 Claims, 7 Drawing Sheets

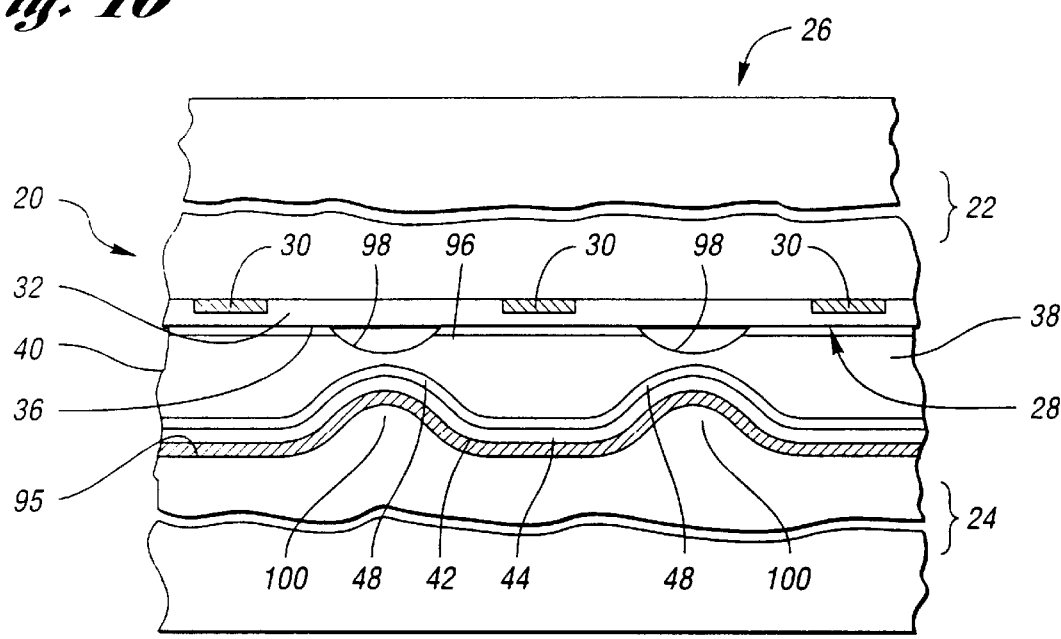
Fig. 16
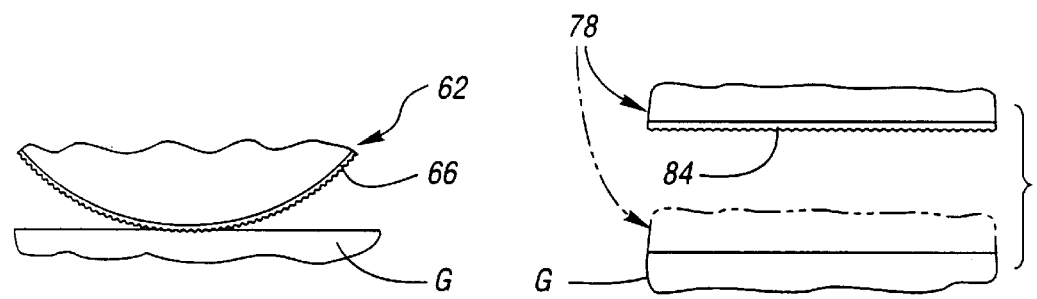
Fig. 17
Fig. 20
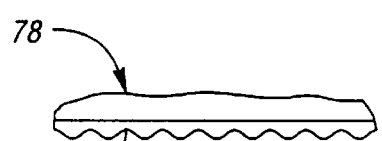
Fig. 18
Fig. 21
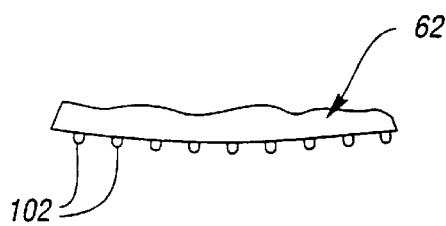
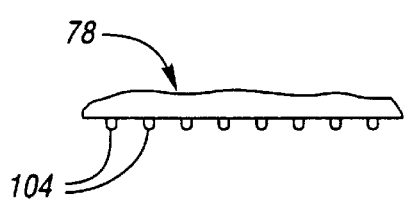
Fig. 19
Fig. 22

APPARATUS FOR MAKING BACK GLASS SUBSTRATE FOR PLASMA DISPLAY PANEL AND RESULTANT PRODUCT

RELATED APPLICATION

The present application is a division of Ser. No. 08/899,917, filed Jul. 24, 1997 now U.S. Pat. No. 6,194,042.

Technical Field

The present invention relates to a method and apparatus for making a back glass substrate for plasma display panels and also relates to the resultant product.

BACKGROUND ART

Plasma display panels are currently expected to replace cathode ray tubes for many uses such as televisions, monitors, and other video displays. One important advantage of plasma display panels is that a relatively large display area can be provided with relatively minimal thickness as compared to cathode ray tubes.

The general construction of plasma display panels includes generally sheet like front and back glass substrates having inner surfaces that oppose each other with a chemically stable gas hermetically sealed therebetween by a seal between the substrates at the periphery of the panel. Elongated electrodes covered by a dielectric layer are provided on both substrates with the electrodes on the front glass substrate extending transversely to the electrodes on the back glass substrate so as to thereby define gas discharge cells or pixels that can be selectively energized by an electrical driver of the plasma display panel. The panels can be provided with phosphors to enhance the luminescence and thus also the efficiency of energizing the panels. The phosphors can also be arranged in pixels having three subpixels or gas discharge cells for respectively emitting the primary colors red, green, and blue to provide a full color plasma display panel.

The conventional construction of back glass substrates for plasma display panels has elongated gas discharge troughs and barrier ribs that space the troughs from each other so as to thus generally isolate each column of pixels within each trough from the columns of pixels on each side thereof and thereby provide good color separation and pixel definition. The gas discharge trough and barrier rib construction can be inexpensively provided by a known thick film printing technique utilizing thick film electrodes typically made of silver, nickel or aluminum paste and covered by dielectric paste for electrical insulation. However, this thick film printing technique, although relatively inexpensive, is difficult to apply to large areas requiring fine patterning due to deformation of print screens and the substrate itself.

Another way in which the back glass substrate gas discharge trough and barrier rib construction can be provided is by first applying thick film electrodes on the substrate and then applying a thick film dielectric glass layer that is typically then fired. A thick film barrier material film frit is then applied and dried. Thereafter, a photoresist film is laminated on the dried frit layer. The photoresist layer is then patterned by a conventional photolithographic process to provide a protecting layer prior to sandblasting that removes material to provide the gas discharge trough and barrier rib construction that is then heated to provide sintering.

DISCLOSURE OF THE INVENTION

One object of the present invention is to provide an improved method for making a back glass substrate for a plasma display panel.

In carrying out the above object, the improved method for making a back glass substrate for a plasma display panel is performed by forming hot sheet glass heated above its annealing point to provide gas discharge troughs spaced by barrier ribs and by thereafter cooling the formed sheet glass to provide the back glass substrate.

Forming of the hot sheet glass while heated above its annealing point to provide the gas discharge trough and barrier rib construction eliminates the need for thick film printing or sandblasting and the resultant problems associated with such conventional processing.

The gas discharge trough and barrier rib forming can be performed on sheet glass that is either a hot sheet glass ribbon or discrete glass sheets.

In one practice of the method, the gas discharge troughs and barrier ribs are formed in the hot sheet glass by rolling engagement with curved projections spaced from each other along a rotational axis of the curved projections. The curved projections can be cooled by a liquid coolant to control temperature. This rolling engagement can also utilize a rotating roll having a smooth outer surface that cooperates with the curved projections in an opposed relationship to provide the gas discharge trough and barrier rib forming in the hot sheet glass.

In another practice of the method, a press member having a generally flat forming face including elongated projections of a straight shape spaced from each other in a parallel relationship and the hot glass sheet are moved relative to each other to provide pressing of the press member against the hot sheet glass to form the gas discharge troughs and barrier ribs. The press member and sheet glass are then disengaged from each other.

After the forming of the gas discharge troughs and barrier ribs, the press member can be cooled by a liquid coolant prior to disengaging the hot sheet glass.

After the forming of the gas discharge trough and barrier rib construction, the back glass substrate can be cooled by pressurized gas to provide compressive stresses that strengthen the substrate.

The gas discharge trough and barrier rib forming can be performed on hot sheet glass having a metal layer that provides electrodes in the gas discharge troughs and also can include removal of the metal layer from the barrier ribs between the troughs.

In addition, the gas discharge trough and barrier rib forming can be performed on hot sheet glass having a metal layer and an outer dielectric layer to provide insulated electrodes within the gas discharge troughs.

The method can also be performed by providing the gas discharge troughs with bottom surfaces formed with an undulating shape along their lengths. This undulating shape of the bottom surfaces of the troughs is formed in one practice by rolling engagement with undulating projections of a generally curved shape on a rotatable forming member. In another practice, the undulating shape of the bottom surfaces of the troughs is formed by engagement with a press member having elongated undulating projections of a generally straight shape spaced from each other in a parallel relationship.

In addition, the method can also be performed by forming the barrier ribs with distal ends of an elongated shape having spaced openings that provide communication between adjacent gas discharge troughs.

In the preferred practice of the method, the gas discharge troughs have bottom surfaces formed with an undulating shape having spaced peaks along their lengths, and the barrier ribs are formed with distal ends of an elongated shape having spaced openings that are located adjacent the peaks of the bottom surfaces and provide communication between adjacent gas discharge troughs.

Another object of the invention is to provide improved apparatus for making a back glass substrate for a plasma display panel.

In carrying out the immediately preceding object, the apparatus for making a back glass substrate for a plasma display panel includes a conveyor for conveying hot sheet glass heated above its annealing point and also includes a forming member that engages the hot sheet glass to form gas discharge troughs and barrier ribs that space the troughs from each other.

In one construction of the apparatus, the conveyor is a ribbon former including a bath for molten tin on which a hot sheet glass ribbon heated above its annealing point is floated and then delivered for the forming of the gas discharge troughs and barrier ribs in the hot sheet glass ribbon.

The forming member of the apparatus is also disclosed as including curved projections spaced along a rotational axis of the forming member and engaged with the hot sheet glass by rolling engagement that provides the gas discharge troughs and barrier ribs. This construction of the apparatus is also disclosed as including a rotatable roll having a smooth outer surface that cooperates with the curved projections in an opposed relationship to provide the forming of the gas discharge troughs and barrier ribs.

The forming member is also disclosed as being embodied by a press member having a generally flat forming face including elongated projections of a straight shape spaced from each other in a parallel relationship.

In addition, the apparatus is disclosed as including a quench station for cooling the formed back glass substrate to provide compressive stresses that strengthen the substrate.

The forming member of the apparatus is further disclosed as including undulating projections that form the gas discharge troughs in the hot sheet glass with bottom surfaces having an undulating shape along their lengths. In one embodiment, the undulating projections have a generally curved shape and engage the hot sheet glass by rolling engagement upon rotation of the forming member. In another embodiment, the undulating projections have a generally straight shape and engage the hot sheet glass by a pressing action upon relative movement between the forming member and the hot sheet glass.

The apparatus is also constructed with the forming member including spaced protrusions that form spaced openings in distal ends of the barrier ribs.

The preferred construction of the apparatus has the forming member including undulating projections that form the gas discharge troughs in the hot sheet glass with bottom surfaces having an undulating shape with spaced peaks along their lengths. The forming member also includes protrusions that form distal ends of the barrier ribs with spaced openings located adjacent the peaks of the undulating bottom surfaces of the gas discharge troughs.

Another object of the present invention is to provide an improved back glass substrate for a plasma display panel.

In carrying out the immediately preceding object, the back glass substrate for a plasma display panel includes an outer smooth surface that faces rearwardly during use and also includes an inner surface having gas discharge troughs and barrier ribs that are hot formed in the substrate while heated above its annealing point.

The back glass substrate is also disclosed as including electrodes located within the gas discharge troughs and formed from a metal layer on the inner surface by the hot forming of the gas discharge troughs and the barrier ribs. In addition, the back glass substrate is also disclosed as including a dielectric layer that covers the electrodes within the gas discharge troughs and is formed from a flat dielectric layer over the metal layer by the hot forming of the gas discharge troughs and the barrier ribs.

The back glass substrate is disclosed as having the barrier ribs including distal ends of elongated shapes having openings spaced along their lengths to provide communication between the gas discharge troughs. The gas discharge troughs have bottom surfaces of an undulating shape along their lengths. The undulating bottom surfaces of the gas discharge troughs have peaks located adjacent the openings in the distal ends of the barrier ribs.

Another object of the present invention is to provide an improved plasma display panel.

In carrying out the immediately preceding object, the plasma display panel includes a front glass substrate having an outer surface that faces forwardly during use of the panel and an inner surface that faces rearwardly. This inner surface of the front glass substrate includes elongated electrodes extending in a spaced and parallel relationship to each other in a first direction and also includes a dielectric layer covering the electrodes. The plasma display panel also includes a back glass substrate having an outer surface that faces rearwardly during use of the panel and an inner surface that faces forwardly in an opposed relationship to the inner surface of the front glass substrate. The inner surface of the back glass substrate includes gas discharge troughs and barrier ribs that are hot formed in the substrate while heated above its annealing point. The gas discharge troughs and barrier ribs are elongated in a second direction transverse to the first direction along which the electrodes of the front glass substrate extend. The gas discharge troughs include elongated electrodes and a dielectric layer that covers the electrodes in the troughs.

The gas discharge troughs of the back glass substrate of the plasma display panel as previously mentioned have bottom surfaces of an undulating shape along their lengths. The undulating bottom surfaces of the gas discharge trough include spaced peaks. The barrier ribs of the back glass substrate of the plasma display panel have distal ends of elongated shapes having openings spaced along their lengths to provide communication between the gas discharge troughs. The peaks of the bottom surfaces of the gas discharge troughs are located adjacent the openings in the distal ends of the barrier ribs.

The plasma display panel is also disclosed as including phosphors. The phosphors provide enhanced luminescence and can also be arranged in pixels, each of which includes subpixels having phosphors that emit red, green, and blue primary colors to provide a full color display.

The objects, features and advantages of the invention are readily apparent from the following detailed description of the best modes for carrying out the invention when considered with the referenced drawings.

BRIEF DESCRIPTION OF THE DRAWINGS

FIG. 16 illustrates the plasma display panel as being of the columnar discharge type and is taken longitudinally along one of the gas discharge troughs to illustrate the undulating shape of a bottom surface thereof and to also illustrate openings in distal ends of the barrier ribs for providing communication between adjacent troughs.

FIG. 17 is a somewhat schematic view illustrating the manner in which the undulating bottom surfaces of the gas discharge troughs are made by a rolling operation.

FIG. 18 is a view taken on an enlarged scale illustrating generally curved projections of an undulating shape.

FIG. 19 is a view on an enlarged scale illustrating protrusions that form openings in distal ends of the barrier ribs.

FIG. 20 is a view similar to FIG. 17 but illustrating the manner in which the undulating shape of the bottom surfaces of the gas discharge troughs can be performed by a pressing action.

FIG. 21 is a view that illustrates generally straight projections of an undulating shape that provide the pressing of the undulating shape of the bottom surfaces of the gas discharge troughs.

FIG. 22 is a view that illustrates protrusions utilized during the pressing operation to provide the opening in the barrier rib between the gas discharge troughs.

BEST MODES FOR CARRYING OUT THE INVENTION

Figure 1:
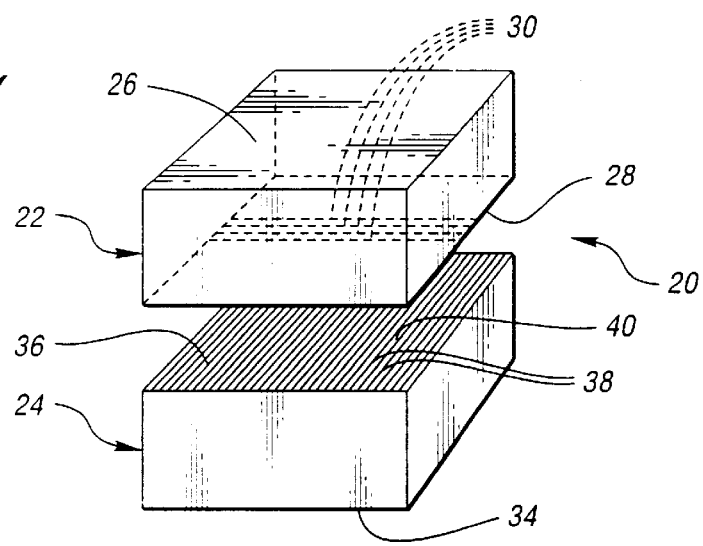
FIG. 1 is an exploded perspective view that is somewhat schematic to illustrate the active area of a plasma display panel constructed in accordance with the present invention.
Figure 2:
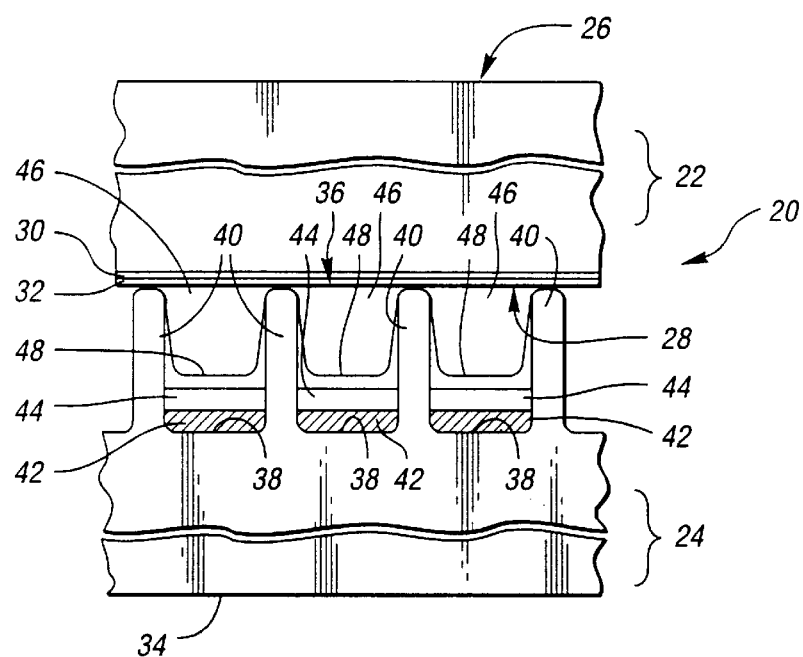
FIG. 2 is a partially broken away sectional view taken through the plasma display panel to illustrate its construction.

With reference to the somewhat schematic view of FIG. 1 of the drawings, an alternating current plasma display panel constructed in accordance with the invention is generally indicated by 20. This plasma display panel 20 includes a generally sheet like front glass substrate 22 and a generally sheet like back glass substrate 24. The front glass substrate 22 has an outer surface 26 that faces forwardly during use toward the viewer of the display. The front glass substrate 22 also includes an inner surface 28 that faces rearwardly during use and includes elongated electrodes 30 over its extent with only several of these being illustrated by schematic hidden line representation. These electrodes 30, as illustrated in FIG. 2, are covered by a dielectric layer 32. The electrodes 30 extend in a spaced and parallel relationship to each other in a first direction generally between opposite extremities of the display panel 20 where suitable electrical connections are made to an electrical driver. Although the front and back glass substrates 22 and 24 for ease of illustration are shown somewhat block shaped, they actually have sheet like shapes with relatively large dimensions between their opposite extremities and relatively thin thicknesses.

With continuing reference to FIG. 1 and additional reference to FIG. 2, the back glass substrate 24 of the plasma display panel 20 includes an outer surface 34 that faces rearwardly during use of the panel away from the observer and also includes an inner surface 36 that faces forwardly in an opposed relationship to the inner surface 28 of the front glass substrate 22. This inner surface 36 of the back glass substrate 24, as illustrated in FIG. 2, includes gas discharge troughs 38 and also includes barrier ribs 40 that space the gas discharge troughs from each other. The gas discharge trough and barrier rib construction is hot formed in the substrate while heated, as is hereinafter more fully described, above its annealing point which is a temperature to which the glass must be heated to provide annealing. These gas discharge troughs 38 and barrier ribs 40 are elongated, as schematically illustrated in FIG. 1, extending in a spaced and parallel relationship to each other in a second direction that is transverse to the first direction of the electrodes 30 of the front glass substrate 22. The back glass substrate 24 includes elongated electrodes 42 within the gas discharge troughs 38 and each of these electrodes is covered by a dielectric layer 44 that may be covered with an unshown thin layer of magnesium oxide or other suitable secondary emissive thin film that lowers the necessary voltage for discharge to occur. The electrodes 42 of the back glass substrate extend to at least one extremity of the display panel 20 for connection with an electrical driver of the panel.

A gas discharge cell or pixel 46 is provided at each crossing location of each electrode 30 of the front glass substrate 22 and each electrode 42 of the back glass substrate 24. A chemically stable gas is hermetically sealed by a seal between the peripheries of the front and back glass substrates 22 and 24 and is energized by an alternating current electrical driver to provide luminescence that provides the plasma display operation.

One construction that can be utilized has alternating electrodes 42 of the back glass substrate 24 extending to the opposite extremities of the display panel, which facilitates connection of the electrodes to the electrical driver by providing a greater spacing between the electrodes at the connection locations.

As illustrated in FIG. 2, the gas discharge troughs 38 may also have phosphors 48 that enhance the luminescence and also can be arranged in pixels having three adjacent gas discharge troughs providing subpixels for emitting the three primary colors red, green, and blue to provide a full color display. In the latter case, the pitch of the spacing between the gas discharge troughs 38 should be approximately one-third of the pitch between the electrodes 30 of the front glass substrate to have the same pixel resolution in both directions of the panel. Note that the phosphor may be used as some or all of the dielectric layer, in which case the previously mentioned secondary emissive thin film may be applied over the phosphor.

With continuing reference to FIG. 2, it will be noted that the thickness of the front and back glass substrates 22 and 24 is broken away because the depth of the gas discharge troughs 38 and the corresponding height of the barrier ribs 40 is only on the order of magnitude of thousandths of an inch as compared to the much thicker substrates. For example, in one desired construction, the spacing pitch between the gas discharge troughs is four thousandths of an inch with each trough having a width of three thousandths of an inch, each barrier rib 40 having a width of one thousandth of an inch and a height of four thousandths of an inch. These exemplary dimensions are not intended to limit the invention, but rather to provide a general understanding of the relatively small dimensions involved with the hot forming of the back glass substrate 24 as is hereinafter more fully described. Also, it should be noted that the dielectric layer 44 and phosphors 48 are also very thin, e.g. a number of microns thick, but are shown thicker for ease of illustration.

Figure 3:
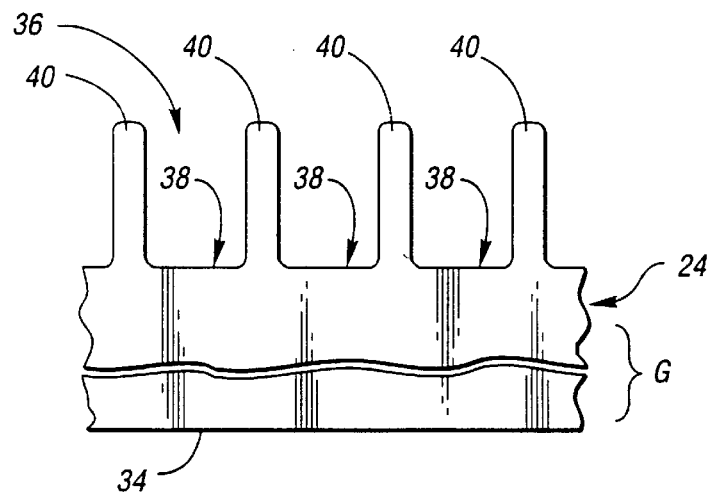
FIG. 3 is a partially broken away sectional view taken in the same direction as FIG. 2 to illustrate a back glass substrate that is constructed in accordance with the present invention and utilized to assemble the plasma display panel.

After completion of the hot forming as is hereinafter more fully described, the back glass substrate 24 has a construction as illustrated in FIG. 3 prior to provision of the electrodes 42, dielectric layer 44, and phosphors 48, as illustrated in FIG. 2, and prior to assembly with the front panel 22 to provide the plasma display panel 20.

It should also be noted that the cross section of the gas discharge troughs 38 and barrier ribs 40 is not necessarily totally uniform along their entire lengths between the opposite extremities of the display panel. For example, at one or both ends, the gas discharge troughs 38 and ribs 40 may be inclined to meet each other in a manner that facilitates connection to the electrical driver of the panel.

Figure 4:
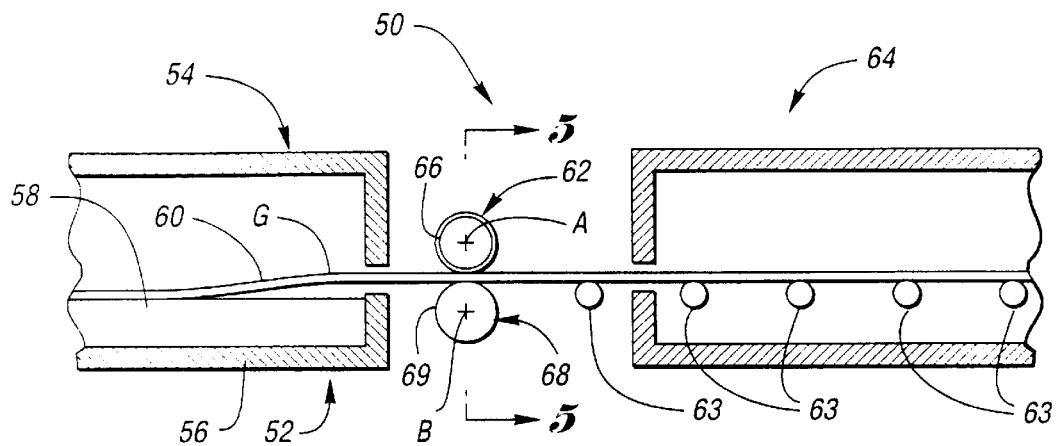
FIG. 4 is an elevational view illustrating one construction of apparatus constructed in accordance with the present invention and utilized to perform the method thereof to provide a gas discharge trough and barrier rib construction on hot sheet glass illustrated as a glass sheet ribbon.

With reference to FIG. 4, one construction of apparatus 50 according to the invention is utilized to perform the method of the invention for making the back glass substrate 24 previously described. The apparatus and the method will be described in an integrated manner with each other to facilitate an understanding of the invention.

As illustrated in FIG. 4, the apparatus 50 includes a conveyor 52 for providing hot sheet glass G heated above its annealing point. In this embodiment of the apparatus, the conveyor 52 is a ribbon former 54 including a tank 56 for containing a bath 58 of molten tin on which a newly formed hot glass sheet ribbon 60 is floated and then delivered upon movement toward the right. The apparatus 50 also includes a forming member 62 that engages the hot sheet glass G to form the gas discharge troughs 38 and barrier ribs 40 that space the troughs from each other as previously described in connection with FIGS. 1–3. After the forming, as is hereinafter more fully described, the glass sheet ribbon 60 is conveyed by rolls 63 to and through an annealing lehr 64 so as to remove compressive stresses and permit cutting thereof into discrete sheets that define the back glass panel.

As previously mentioned, the hot forming of the glass sheet must be performed at a temperature above the annealing point. The extent to which the glass is heated above the annealing point depends upon the type of glass utilized and the speed at which the forming is performed. More specifically, a higher temperature will permit faster forming; however, the temperature should not be so high as to cause sticking of the hot sheet glass as it disengages the forming member 62 after the forming.

Figure 5:
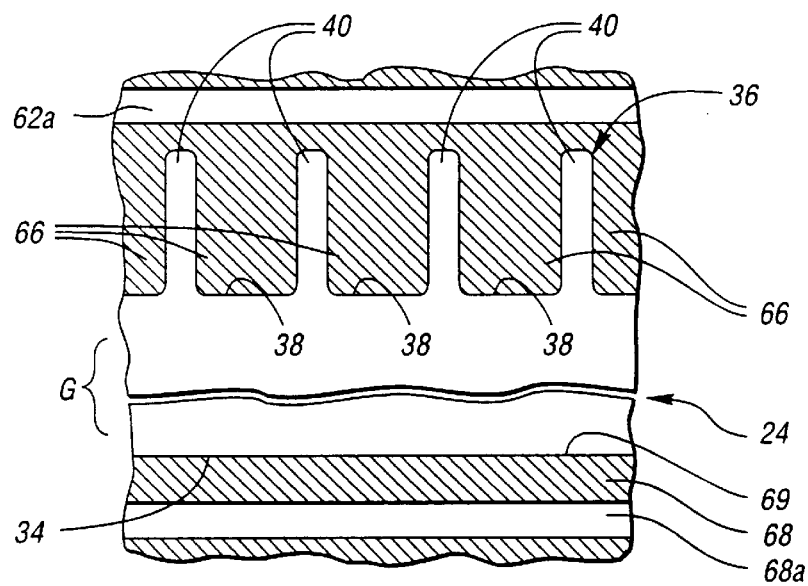
FIG. 5 is a sectional view taken along the direction of line 5—5 in FIG. 4 to illustrate the manner in which the gas discharge trough and barrier rib construction is performed by rolling engagement.

With continuing reference to FIG. 4 and additional reference to FIG. 5, the forming member 62 is illustrated as a roll rotatable about a rotational axis A and including curved projections 66 that are spaced along this rotational axis A, as illustrated in FIG. 5. Engagement of the hot sheet glass G heated above its annealing point forms the gas discharge troughs 38 and barrier ribs 40 in the inner surface of the back glass substrate. It should be appreciated that while a complete roll is illustrated, it is possible for a roll of a sufficient size to provide the forming by less than one revolution such that the forming member could then be constructed as a partial roll. When it is desired to have ends of the gas discharge troughs adjacent the periphery of the panel inclined as previously described so as to meet with the top of the barrier ribs 40, there can be a corresponding change in the curved projections 66 of the forming member 62. It is also possible to provide this inclination by moving the axis of rotation A of the forming member upon engaging the hot sheet glass adjacent the locations providing the ends of the gas discharge trough and barrier rib construction. Furthermore, as is hereinafter more fully described, the forming member 62 can have protrusions between the curved projections 66 for providing openings in the distal ends of the barrier ribs 40 to provide communication between adjacent troughs.

With continuing reference to FIGS. 4 and 5, the apparatus 50 is also illustrated as including a roll 68 that is rotatable about an axis B and has a smooth outer surface 69 that engages the hot sheet glass G. The smooth roll surface cooperates with the curved projections 66 of the forming member 62 in an opposed relationship to provide the hot forming of the gas discharge troughs 38 and barrier ribs 40. As illustrated, the forming member 62 is above the glass sheet ribbon 60 and the roll 68 is below the ribbon. It is also possible for the respective positions of these components to be reversed. However, the construction shown is advantageous from the standpoint that the formed upper surface does not have to be engaged to support the sheet glass as does the lower surface. Both the forming member 62 and the roll 68 can be made from stainless steel so as to be resistant to chemical reaction and deterioration. Also, as illustrated in FIG. 5, the forming member 62 and the roll 68 may have associated passages 62a and 68a through which a liquid coolant flows to control the temperature during use. It may also be possible to manufacture these components from sinter-bonded fuse silica particles so as to have a low coefficient of thermal expansion and good resistance to thermal warpage.

Figure 6:
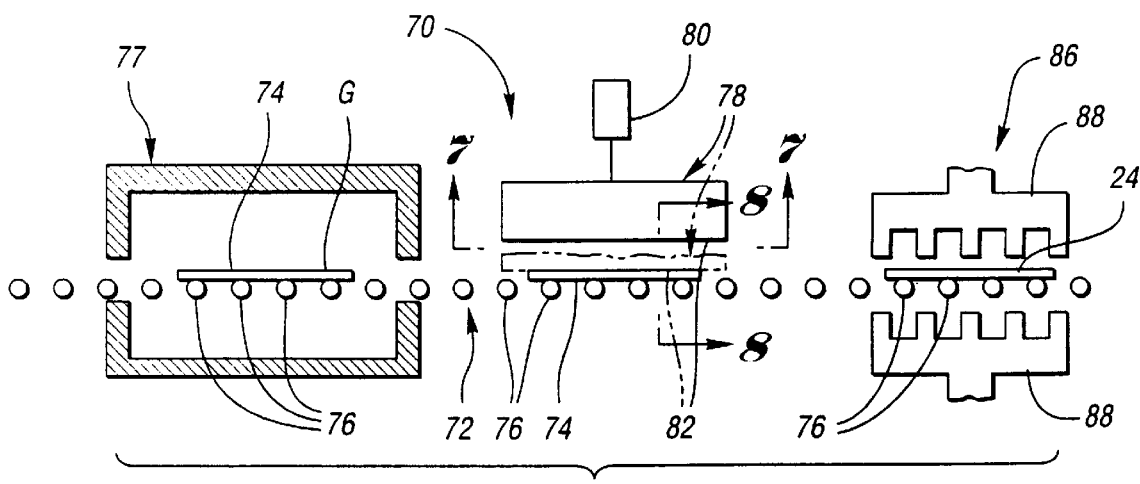
FIG. 6 is an elevational view that illustrates another construction of apparatus constructed according to the invention and utilized to perform the method thereof by a press member having a forming face that forms the hot sheet glass which is disclosed as discrete glass sheets and which is also disclosed as being moved to a quench station of the apparatus after such forming to provide cooling that increases the mechanical strength of the substrate.

With reference to FIG. 6, another embodiment of apparatus 70 according to the invention is also utilized to perform the method thereof, but has its conveyor 72 constructed to deliver the hot sheet glass G as discrete glass sheets 74 heated above the annealing point to permit the forming. More specifically, the conveyor 72 is illustrated as having rolls 76 although other types of conveyance could also be utilized. Furthermore, a heater 77 is illustrated as providing heating of the discrete glass sheets 74 upon movement from the left toward the right during the processing. The apparatus 70 is also illustrated as having a forming member constructed as a press member 78 that provides the forming by a pressing operation. This press member 78 includes a suitable actuator 80 for providing movement thereof from the solid line indicated position to the phantom line indicated position to provide the forming.

Figure 7:
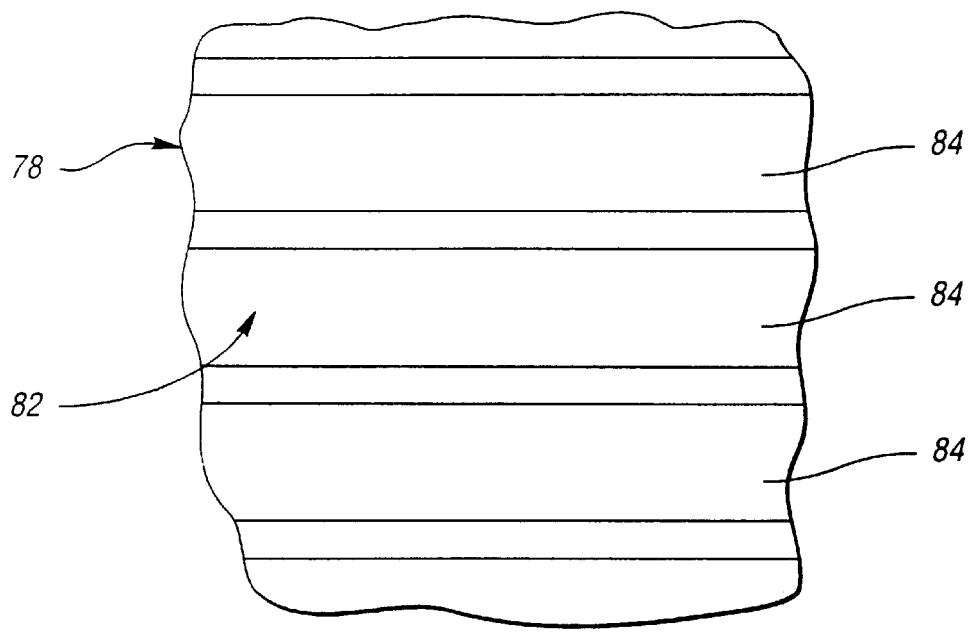
FIG. 7 is a bottom plan view taken along the direction of line 7—7 in FIG. 6 to illustrate the construction of the forming face of the press member.
Figure 8:
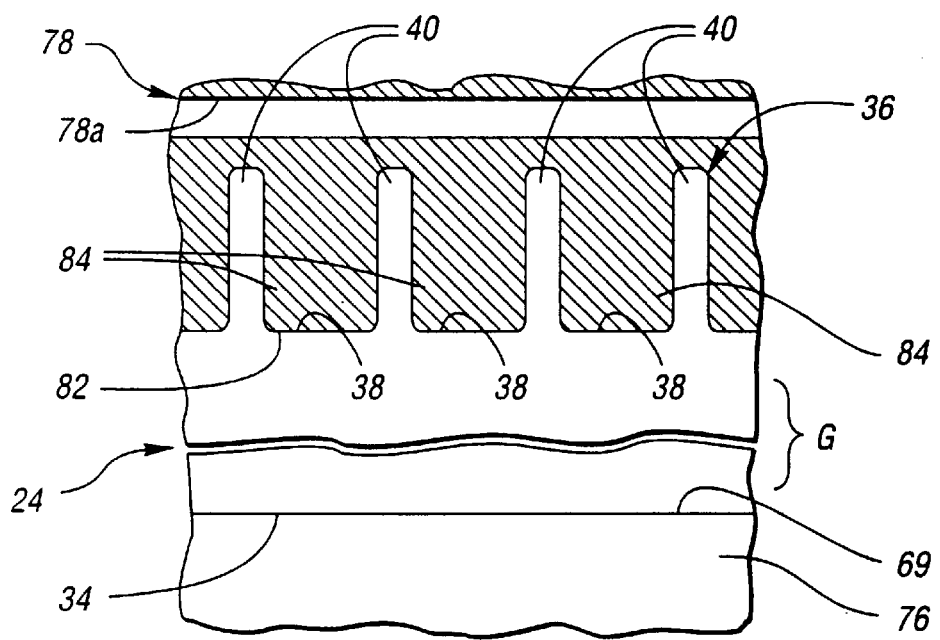
FIG. 8 is a sectional view taken along the direction of line 8—8 in FIG. 6 to illustrate the manner in which the press member engages the hot sheet glass to provide the forming of the gas discharge trough and barrier rib construction.

With continuing reference to FIG. 6 and additional reference to FIGS. 7 and 8, the press member 78 has a generally flat forming face 82 including elongated projections 84 of a straight shape that are spaced from each other in a parallel relationship, as shown in FIG. 7. Engagement of the forming face 82 with the hot sheet glass G provided by the discrete sheets 74 forms the gas discharge troughs 38 and barrier ribs 40 of the construction previously described, as illustrated in FIG. 8. After the forming, the press member is moved out of engagement with the formed substrate.

A press member 78 may be constructed from stainless steel to be resistant to chemical reaction or can be made from sinter-bonded fused silica particles so as to have a low coefficient of thermal expansion and resistance to thermal warpage. When the press member is made from stainless steel, it is also possible to utilize passages 78a, as illustrated in FIG. 8, for a liquid coolant that controls the temperature of the press member. More specifically, it is believed to be advantageous to provide cooling of the press member 78 after engagement with the hot sheet glass so as to thereby lower the glass temperature before disengagement of the press member from the glass. Such cooling of the glass will prevent sticking of the forming face 82 of the press member with the glass and thus prevent distortion of the formed gas discharge troughs and barrier ribs. Also, the longitudinal ends of the gas discharge troughs 38 and barrier ribs 40 can meet each other by providing appropriate inclinations to the longitudinal ends of the elongated projections 84 of press member forming face 82.

It is also possible to utilize the press member 78 to provide forming of hot sheet glass as a continuous ribbon as illustrated in FIG. 4; however, such forming requires movement of the press member 78 along with the ribbon such that the forming would be more involved.

With continuing reference to FIG. 6, it will be noted that the apparatus 70 is illustrated as including a quench station 86 to which the conveyor 72 conveys the formed back glass substrate 24 to provide rapid cooling thereof that generates compressive stresses in the glass for strengthening purposes. More specifically, the cooling can be sufficient to heat strengthen or can be greater to provide tempering. As illustrated, the quench station has lower and upper blast heads 88 for providing pressurized air that performs the cooling while conveyed by the conveyor rolls 76.

Figure 9:
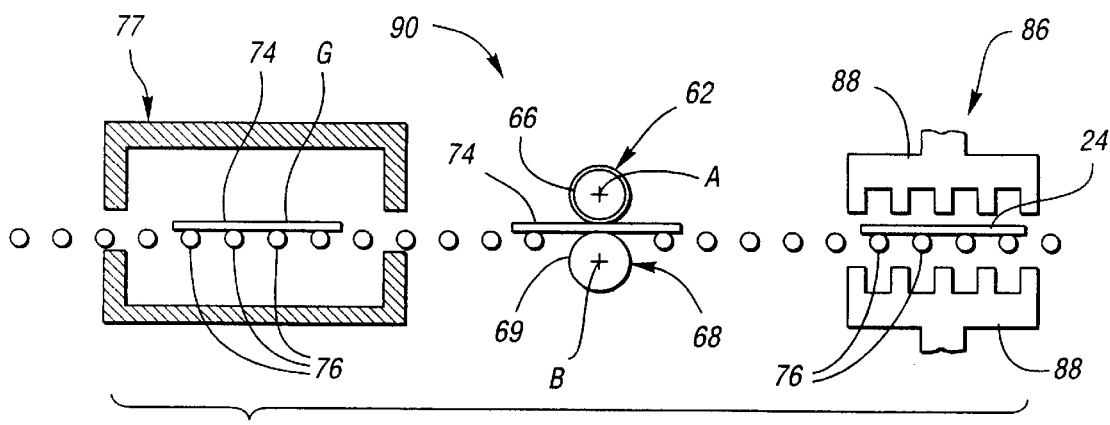
FIG. 9 is a view of another construction of the apparatus that is similar to the embodiment of FIG. 6 as far as providing the forming on discrete glass sheets, but utilizes the roll action forming of the embodiment of FIG. 4 to provide the gas discharge trough and barrier rib construction.

With reference to FIG. 9, another embodiment of apparatus 90 constructed in accordance with the invention to perform the method thereof is similar to the embodiment of FIG. 4 with its forming member 62 constructed to include curved projections 66 for roll forming of the gas discharge trough and barrier rib construction as previously described. However, this embodiment of the apparatus 90, unlike the embodiment of FIG. 4, does not perform the forming of the hot sheet glass on a continuous glass ribbon. Rather, like the embodiment of the apparatus 70 in FIG. 6, apparatus 90 performs the hot forming on discrete glass sheets 74. Thus, upstream and downstream from the forming member 62, the apparatus 90 is the same as the embodiment of FIG. 6 as far as including the heater 77 and the quench station 86 where the discrete glass sheets 74 are processed. Apparatus 90 also has a roll 68 with a smooth outer surface that cooperates with the forming member 62 in the same manner previously described in FIG. 4.

Figure 10:
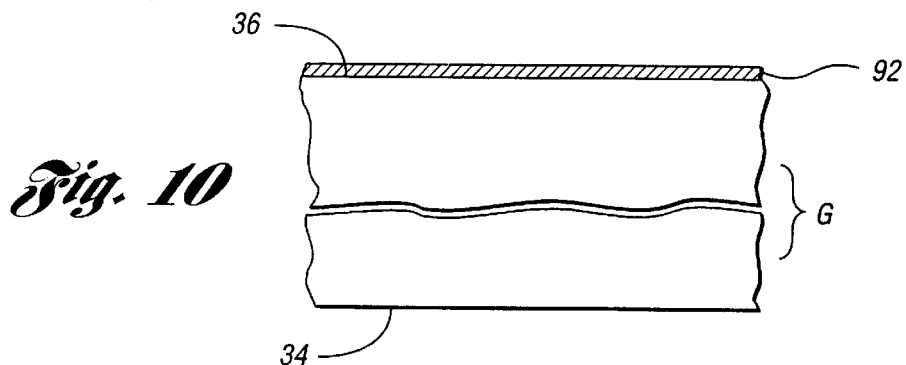
FIG. 10 is a partially broken away sectional view through sheet glass which has a metal layer that can be utilized in the back glass substrate forming to provide electrodes.
Figure 11:
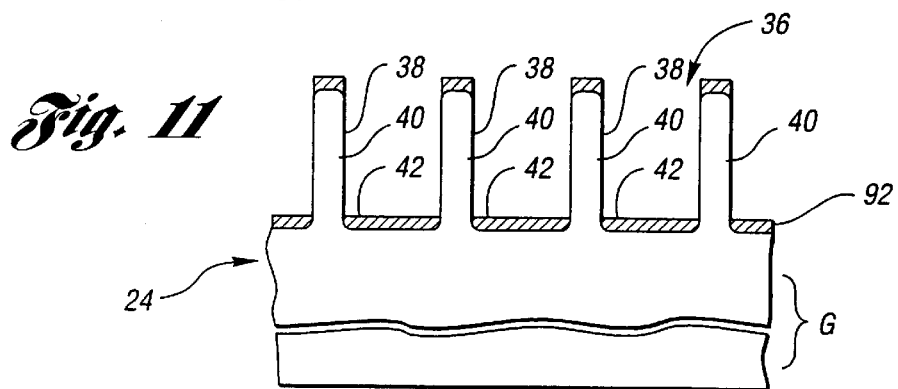
FIG. 11 is a view that illustrates the back glass substrate after the forming to provide the gas discharge trough and barrier rib construction with electrodes provided in the gas discharge troughs by the metal layer.

With reference to FIG. 10, the hot sheet glass G can be provided with a metal layer 92 on the surface 36 that eventually provides the inner surface of the back glass substrate. After the forming, the metal layer 92 defines the electrodes 42 within the gas discharge troughs 38 as illustrated in FIG. 11.

Figure 12:
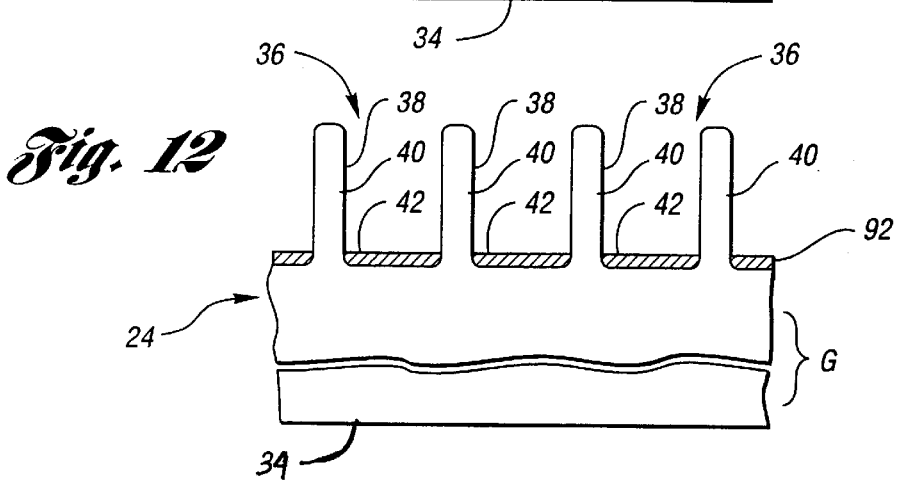
FIG. 12 is a view similar to FIG. 11 but illustrating the metal layer as being removed from the top of the barrier ribs.

As illustrated in FIG. 12, it is also possible to subsequently remove the metal layer 92 from the ribs 40 prior to completion of the manufacturing of the back glass panel 24.

Figure 13:
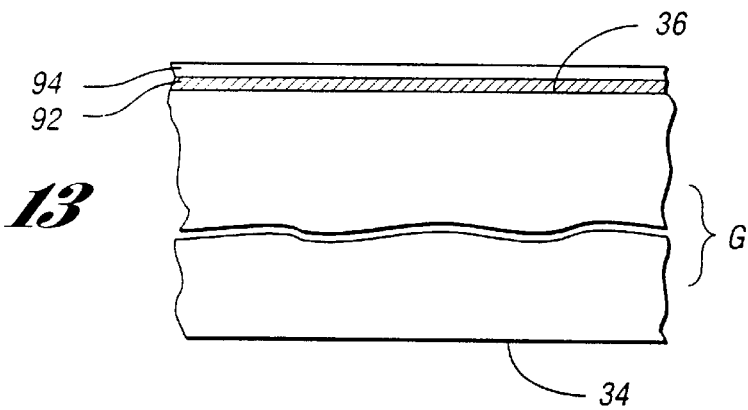
FIG. 13 is a view similar to FIG. 10 but further illustrates a dielectric layer over the metal layer on the sheet glass that is formed to provide the back glass substrate.
Figure 14:
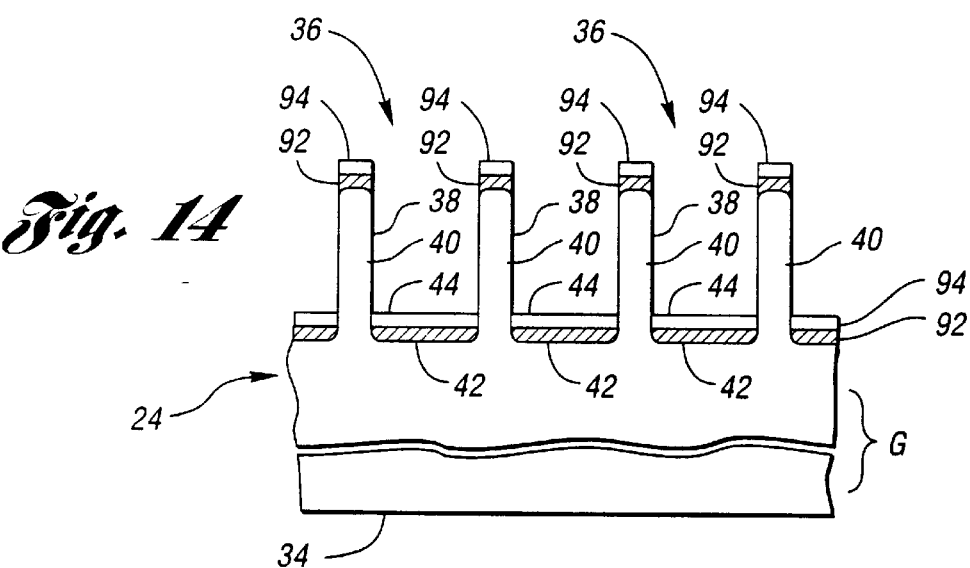
FIG. 14 is similar to FIG. 11 illustrating the formed back glass substrate with both the electrodes and dielectric layer covering the electrodes in the gas discharge troughs.
Figure 15:
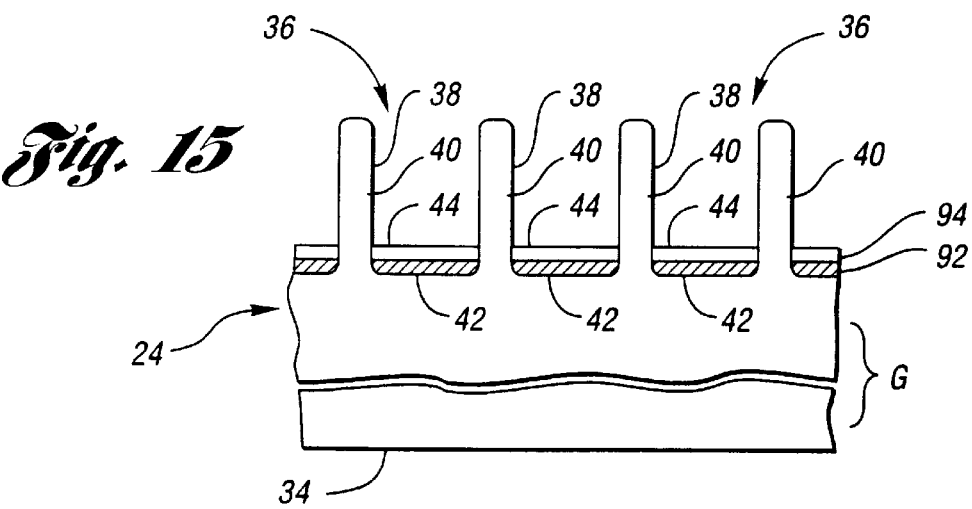
FIG. 15 is a view similar to FIG. 12 and further illustrates removal of the metal layer and dielectric layer from the barrier ribs between the gas discharge troughs.

With reference to FIG. 13, the hot sheet glass G can also have a dielectric layer 94 provided on the inner surface 36 over the metal layer 92 prior to the forming of the gas discharge and barrier rib construction. After such forming, the metal layer 92 provides the electrode 42 and the dielectric layer 94 provides the dielectric layer 44 within the gas discharge troughs 38. If necessary, the metal layer 92 as well as the dielectric layer 94 can be removed in any suitable manner from the ribs 40 as shown in FIG. 15 during the continued manufacturing of the back glass substrate.

With reference to FIG. 16, the plasma display panel 20 is illustrated as being of the columnar discharge type such that the discharge is between the front and back electrodes 30 and 42. Also, the back glass substrate 24 can have the gas discharge troughs 38 provided with bottom surfaces 95 of an undulating shape along their lengths. Furthermore, the barrier ribs 40 include distal ends 96 of elongated shapes having openings 98 that provide communication between the adjacent gas discharge troughs 38. The bottom surfaces 95 of the gas discharge troughs 38 include peaks 100 located adjacent the openings 98 in the distal ends 96 of the barrier ribs 40. The phosphors 48 are located within the gas discharge troughs 38 extending over the bottom surface peaks 100 with a somewhat saddle shape and, while shown along the entire length of the trough, may be devoid in the valleys between the peaks.

In one practice of the invention, the undulating shape of the bottom surfaces 95 of the gas discharge troughs and the openings 98 in the distal ends 96 of the barrier ribs 40 is provided by a rolling operation. More specifically, as shown in FIGS. 17–19, the rotary forming member 62 may have its generally curved projections 66 provided with an undulating shape whose valleys define the peaks 100 of the bottom surfaces 95 of the gas discharge troughs 38. In addition, between the undulating projections 66, the rotary forming member 62 as shown in FIG. 4 may have spaced protrusions 102 that form the openings 98 in the distal ends 96 of the barrier ribs 40.

With reference to FIGS. 20–22, it is also possible for the undulating shape of the bottom surfaces 95 of the gas discharge troughs 38 and the openings 98 in the distal ends 96 of the barrier ribs 40 to be provided by engagement with the press member 78. More specifically, the press member 78, as shown in FIGS. 20 and 21, has elongated undulating projections 84 of a straight shape that define the undulating bottom surfaces 95 of the gas discharge troughs 38 with the valleys of the undulating projections 84 defining the peaks 100 of the gas discharge bottom surface. Furthermore, between the undulating projections best illustrated in FIG. 21, the press member 78 may have spaced protrusions 104 that define the openings 98 in the distal ends 96 of the barrier ribs 38.

The construction of the plasma display panel 20 illustrated in FIG. 16 whether provided by the rolling operation illustrated in FIGS. 17–19 or the pressing operation illustrated in FIGS. 20–22 provides advantageous operation of the display panel. More specifically, the discharge between the front electrodes 30 and the back electrodes 42 at the valleys between the peaks 100 provides an angular relationship thereof with the phosphors 48 at the locations thereof extending upwardly from the valleys to the peaks. It has been found that this angular relationship provides good luminescence. In this connection, it should be noted that the heights of the peaks 100 should not be so great so as to position the adjacent portions of the back electrodes 42 too close to the front electrodes 30 so that the discharge does not take place at the valleys of the back electrode between the peaks 100.

Furthermore, it should be noted that the openings 98 that communicate the adjacent gas discharge troughs 38 provide for passage of excited species including ions, electrons, photons, excited gas atoms, and metastables that can facilitate priming. In this connection, it will be noted that the openings 98 are located adjacent the peaks 100 so as to be spaced from the front electrodes 30 and the valleys of the back electrode 44 where the discharge takes place so as to prevent discharge between adjacent troughs.

Figure 23:
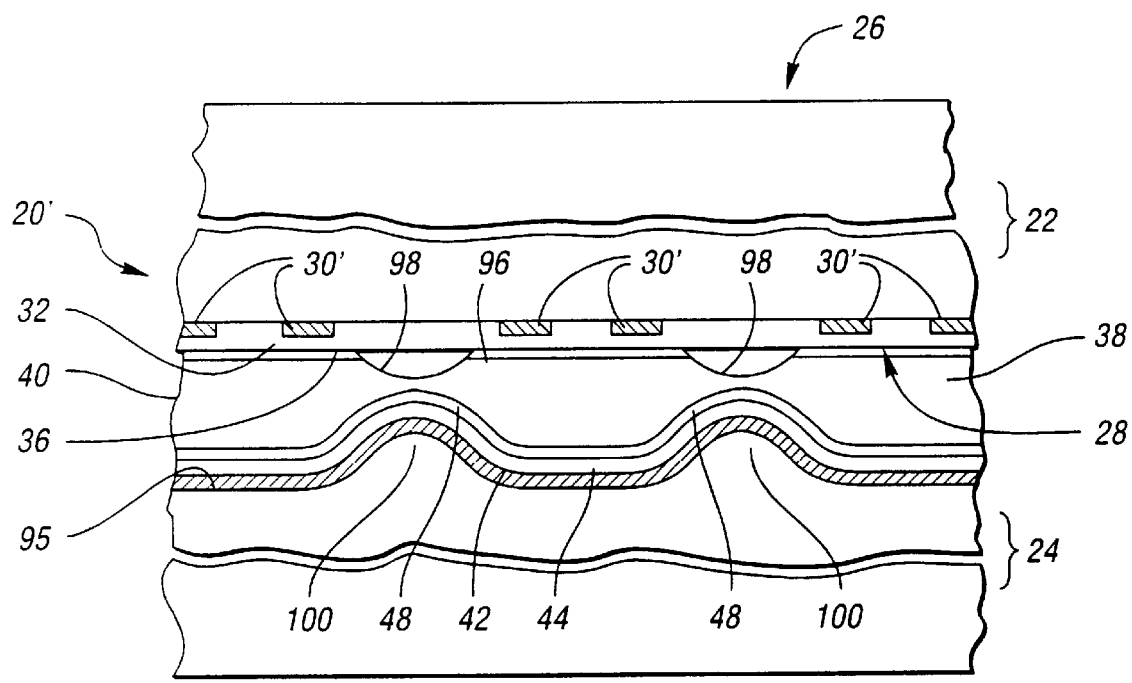
FIG. 23 is a view similar to FIG. 16 but illustrating another embodiment of the plasma display panel which is of the surface discharge type.

With reference to FIG. 23, another embodiment of the plasma display panel 20' is illustrated and has the same construction as the embodiment illustrated in FIG. 16 except that it is of the surface discharge type with the front glass substrate 22 having a pair of electrodes 30' between which the discharge takes place during steady state operation at each gas discharge cell defining a pixel or subpixel as previously discussed. In this embodiment, the back electrode 92 is an addressing electrode that initiates the discharge between the front electrodes 30'. Otherwise, the construction of both embodiments shown in FIGS. 16 and 23 is the same. It should also be mentioned that the angular orientation of the undulating bottom surface 95 of each gas discharge trough 38 can be angularly oriented so as to provide the best luminescence with respect to the discharge whether the discharge is of the columnar type illustrated in FIG. 16 or the surface discharge type illustrated in FIG. 23.

It should be appreciated that the invention has been described for performing the hot forming of the glass on the back substrate 24. However, it is also possible that there may be configurations of the front glass substrate 22 on which hot forming of its inner surface may advantageously be performed. Specifically, it may be possible to form the openings 98 illustrated in FIG. 23 on the front glass substrate 22 as well as providing other desirable formations on the front substrate.

While the best modes for practicing the invention have been described, it should be appreciated that other ways of practicing the invention will be apparent to those skilled in the art as defined by the following claims.

What is claimed is:

1. Apparatus for making a back glass substrate for a plasma display panel, comprising:
    a conveyor for providing hot sheet glass heated above its annealing temperature; and
    a forming member that engages the hot sheet glass to form gas discharge troughs and barrier ribs that space the troughs from each other.

2. Apparatus for making a plasma display panel back glass substrate as in claim 1 wherein the conveyor ribbon former includes a bath for molten tin on which a formed hot glass sheet ribbon is floated and then delivered for the forming of the gas discharge troughs and barrier ribs in the hot glass sheet ribbon.

3. Apparatus for making a plasma display panel back glass substrate as in claim 1 wherein the forming member includes curved projections spaced along a rotational axis of the forming member and engaged with the hot sheet glass by rolling engagement that provides the gas discharge troughs and barrier ribs.

4. Apparatus for making a plasma display panel back glass substrate as in claim 3 further comprising a rotatable roll having a smooth outer surface that cooperates with the curved projections in an opposed relationship to provide the forming of the gas discharge troughs and barrier ribs.

5. Apparatus for making a plasma display panel back glass substrate as in claim 1 wherein the forming member comprises a press member having a generally flat forming face including elongated projections of a straight shape spaced from each other in a parallel relationship.

6. Apparatus for making a plasma display panel back glass substrate as in claim 1 further comprising a quench station for cooling the formed back glass substrate to provide compressive stresses that strengthen the substrate.

7. Apparatus for making a plasma display panel back glass substrate as in claim 1 wherein the forming member includes undulating projections that form the gas discharge troughs in the hot sheet glass with bottom surfaces having an undulating shape along their lengths.

8. Apparatus for making a plasma display panel back glass substrate as in claim 7 wherein the undulating projections have a generally curved shape and engage the hot sheet glass by rolling engagement upon rotation of the forming member.

9. Apparatus for making a plasma display panel back glass substrate as in claim 7 wherein the undulating projections have a generally straight shape and engage the hot sheet glass by a pressing action upon relative movement between the forming member and the hot sheet glass.

10. Apparatus for making a plasma display panel back glass substrate as in claim 7 wherein the forming member includes spaced protrusions that form spaced openings in distal ends of the barrier ribs.

11. Apparatus for making a plasma display panel back glass substrate as in claim 1 wherein the forming member includes undulating projections that form the gas discharge troughs in the hot sheet glass with bottom surfaces having an undulating shape with spaced peaks along their lengths, and the forming member also including protrusions that form distal ends of the barrier ribs with spaced openings located adjacent the peaks of the undulating bottom surfaces of the gas discharge troughs.

12. A back glass substrate for a plasma display panel comprising:
    an outer smooth surface that faces rearwardly during use; and
    an inner surface having gas discharge troughs and barrier ribs that are hot formed in said substrate while heated above its annealing point;

said barrier ribs including distal ends of elongated shapes having openings spaced along their lengths to provide communication between said gas discharge troughs.

13. A plasma display panel back glass substrate as in claim 12 further including electrodes located within the gas discharge troughs and formed from a metal layer on the inner surface by the hot forming of the gas discharge troughs and the barrier ribs.

14. A plasma display panel back glass substrate as in claim 13 further comprising a dielectric layer that covers the electrodes within the gas discharge troughs and is formed from a flat dielectric layer over the metal layer by the hot forming of the gas discharge troughs and the barrier ribs.

15. A plasma display panel back glass substrate as in claim 12 wherein the gas discharge troughs have bottom surfaces of an undulating shape along their lengths.

16. A plasma display panel back glass substrate as in claim 15 wherein the barrier ribs including distal ends of elongated shapes having openings spaced along their lengths to provide communication between the gas discharge troughs, and the undulating bottom surfaces of the gas discharge troughs having peaks located adjacent the openings in the distal ends of the barrier ribs.

17. A plasma display panel comprising:
a front glass substrate having an outer surface that faces forwardly during use of the panel and an inner surface that faces rearwardly and includes elongated electrodes extending in a spaced and parallel relationship to each other in a first direction, and a dielectric layer covering the electrodes; and
a back glass substrate having an outer surface that faces rearwardly during use of the panel and an inner surface that faces forwardly in an opposed relationship to the inner surface of the front glass substrate, the inner surface of the back glass substrate including gas discharge troughs and barrier ribs that are hot formed in the substrate while heated above its annealing point, the gas discharge troughs and barrier ribs being elongated in a second direction transverse to the first direction, and the gas discharge troughs including elongated electrodes and a dielectric layer that covers the electrodes in the troughs;
said barrier ribs including distal ends of elongated shapes having openings spaced along their lengths to provide communication between said gas discharge troughs.

18. A plasma display panel as in claim 17 wherein the gas discharge troughs have bottom surfaces of an undulating shape along their lengths.

19. A plasma display panel as in claim 17 wherein the barrier ribs having distal ends of an elongated shape having openings spaced along their lengths to provide communication between the gas discharge troughs.

20. A plasma display panel as in claim 17 wherein the gas discharge troughs have bottom surfaces of an undulating shape along their lengths and including spaced peaks, the barrier ribs having distal ends of an elongated shape having openings spaced along their lengths to provide communication between the gas discharge troughs, and the peaks of the bottom surfaces of the gas discharge troughs being located adjacent the openings in the distal ends of the barrier ribs.

21. A plasma display as in claim 17 wherein the gas discharge troughs in the back glass substrate include phosphors.

22. A plasma display panel as in claim 21 wherein the gas discharge troughs have bottom surfaces of an undulating shape along their lengths and including spaced peaks, the barrier ribs having distal ends of an elongated shape having openings spaced along their lengths to provide communication between the gas discharge troughs, and the peaks of the bottom surfaces of the gas discharge troughs being located adjacent the openings in the distal ends of the barrier ribs.

23. A plasma display panel comprising:
a front glass substrate having an outer surface that faces forwardly during use of the panel and an inner surface that faces rearwardly and includes elongated electrodes extending in a spaced and parallel relationship to each other in a first direction, and a dielectric layer covering the electrodes; and
a back glass substrate having an outer surface that faces rearwardly during use of the panel and an inner surface that faces forwardly in an opposed relationship to the inner surface of the front glass substrate, the inner surface of the back glass substrate having gas discharge troughs and barrier ribs that are hot formed in the substrate while heated above its annealing point, said gas discharge troughs and barrier ribs being elongated in a second direction transverse to the first direction, said gas discharge troughs including elongated electrodes and a dielectric layer that covers the electrodes in said troughs, and said gas discharge troughs further including phosphors arranged in pixels each of which includes phosphors for emitting red, green and blue primary colors to provide a full color display;
said gas discharge troughs still further having bottom surfaces of an undulating shape along their lengths and including spaced peaks, said barrier ribs having distal ends of an elongated shape having openings spaced along their lengths to provide communication between said gas discharge troughs, and the peaks of the bottom surfaces of said gas discharge troughs being located adjacent the openings in the distal ends of said barrier ribs.

* * * * *